United States Patent [19]
Smith

[11] Patent Number: 6,032,900
[45] Date of Patent: Mar. 7, 2000

[54] AIRCRAFT WHEEL ROTATING DEVICE

[76] Inventor: Robert Alfred Smith, 3131 Fleetwood Dr., San Bruno, Calif. 94066

[21] Appl. No.: 09/109,549

[22] Filed: Jul. 2, 1998

[51] Int. Cl.⁷ .................................................. B64C 25/36
[52] U.S. Cl. ........................................................ 244/103 S
[58] Field of Search ........................... 244/103 S, 103 R, 244/100 R

[56] References Cited

U.S. PATENT DOCUMENTS

| | | | |
|---|---|---|---|
| 3,233,849 | 2/1966 | Rubin | 244/103 S |
| 3,529,792 | 9/1970 | MacMahon | 244/103 S |
| 3,773,283 | 11/1973 | Abplanalp | 244/103 S |
| 3,797,786 | 3/1974 | House | 244/103 S |
| 3,866,860 | 2/1975 | Opitz, Sr. | 244/103 S |
| 4,040,582 | 8/1977 | Krauss | 244/103 S |
| 4,061,294 | 12/1977 | Hawkins | 244/103 S |
| 4,732,350 | 3/1988 | Lamont | 244/103 S |
| 5,213,285 | 5/1993 | Stanko | 244/103 S |
| 5,417,387 | 5/1995 | Jennings | 244/103 S |
| 5,746,393 | 5/1998 | Gennaro | 244/103 S |

FOREIGN PATENT DOCUMENTS

| | | |
|---|---|---|
| 3512324 | 10/1985 | Germany . |
| 2270892 | 3/1994 | United Kingdom . |

*Primary Examiner*—Peter M. Poon
*Assistant Examiner*—Francis T Palo

[57] ABSTRACT

A device for rotating a wheel of an aircraft prior to landing. The inventive device includes an annular plate having a plurality of engaging brackets extending therefrom for coupling to an aircraft wheel. A plurality of air scoops are arranged about the annular plate for capturing oncoming wind to effect rotation of the wheel. A plurality of center vanes extend within the annular plate and react to wind laterally impacting the aircraft wheel to further rotation thereof.

6 Claims, 2 Drawing Sheets

AIRCRAFT WHEEL ROTATING DEVICE

BACKGROUND OF THE INVENTION

1. Field of the Invention

The present invention relates to aerodynamically responsive structures and more particularly pertains to an aircraft wheel rotating device for rotating a wheel of an aircraft prior to landing.

2. Description of the Prior Art

The use of aerodynamically responsive structures is known in the prior art. More specifically, aerodynamically responsive structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art aerodynamically responsive structures include U.S. Pat. No. 5,165,624; U.S. Pat. No. 5,104,063; U.S. Pat. No. 4,491,288; U.S. Pat. No. 4,383,665; U.S. Pat. No. 4,040,582; and U.S. Pat. No. 3,797,786.

While these devices fulfill their respective, particular objectives and requirements, the aforementioned patents do not disclose a aircraft wheel rotating device for rotating a wheel of an aircraft prior to landing which includes an annular plate having a plurality of engaging brackets extending therefrom for coupling to all aircraft wheel, a plurality of air scoops arranged about the annular plate for capturing oncoming wind to effect rotation of the wheel, and a plurality of center vanes extending within the annular plate and reacting to wind laterally impacting the aircraft wheel to further rotate the wheel.

In these respects, the aircraft wheel rotating device according to tile present invention substantially departs from the conventional concepts and designs of the prior art, and in so doing provides an apparatus primarily developed for the purpose of rotating a wheel of an aircraft prior to landing.

SUMMARY OF THE INVENTION

In view of the foregoing disadvantages inherent in the known types of aerodynamically responsive structures now present in tile prior art, the present invention provides a new aircraft wheel rotating device construction wherein tile same call be utilized for pre-rotating an aircraft wheel prior to landing. As such, the general purpose of the present invention, which will be described subsequently in greater detail, is to provide a new aircraft wheel rotating device apparatus and method which has many of the advantages of the aerodynamically responsive structures mentioned heretofore and many novel features that result in a aircraft wheel rotating device which is not anticipated, rendered obvious, suggested, or even implied by any of the prior art aerodynamically responsive structures, either alone or in any combination thereof.

To attain this, the present invention generally comprises a device for rotating a wheel of an aircraft prior to landing. The inventive device includes an annular plate having a plurality of engaging brackets extending therefrom for coupling to an aircraft wheel. A plurality of air scoops are arranged about the annular plate for capturing oncoming wind to effect rotation of the wheel. A plurality of center vanes extend within an annular plate and react to wind laterally impacting the aircraft wheel to further rotation thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of constriction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new aircraft wheel rotating device apparatus and method which has many of the advantages of the aerodynamically responsive structures mentioned heretofore and many novel features that result in a aircraft wheel rotating device which is not anticipated, rendered obvious, suggested, or even implied by any of the prior art aerodynamically responsive strictures, either alone or in any combination thereof.

It is another object of the present invention to provide a new aircraft wheel rotating device which may be easily and efficiently manufactured and marketed.

It is a further object of the present invention to provide a new aircraft wheel rotating device which is of a durable and reliable construction.

An even further object of the present invention is to provide a new aircraft wheel rotating device which is susceptible of a low cost of manufacture with regard to both materials and labor, and which accordingly is then susceptible of low prices of sale to the consuming public, thereby making such aircraft wheel rotating devices economically available to the buying public.

Still yet another object of the present invention is to provide a new aircraft wheel rotating device which provides in the apparatuses and methods of the prior art some of the advantages thereof, while simultaneously overcoming some of the disadvantages normally associated therewith.

Still another object of the present invention is to provide a new aircraft wheel rotating device for rotating a wheel of an aircraft prior to landing.

Yet another object of the present invention is to provide a new aircraft wheel rotating device which includes an annular plate having a plurality of engaging brackets extending therefrom for coupling to an aircraft wheel, a plurality of air scoops arranged about the annular plate for capturing oncoming wind to effect rotation of the wheel, and a plurality of center vanes extending within the annular plate and reacting to wind laterally impacting the aircraft wheel to further rotate the wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
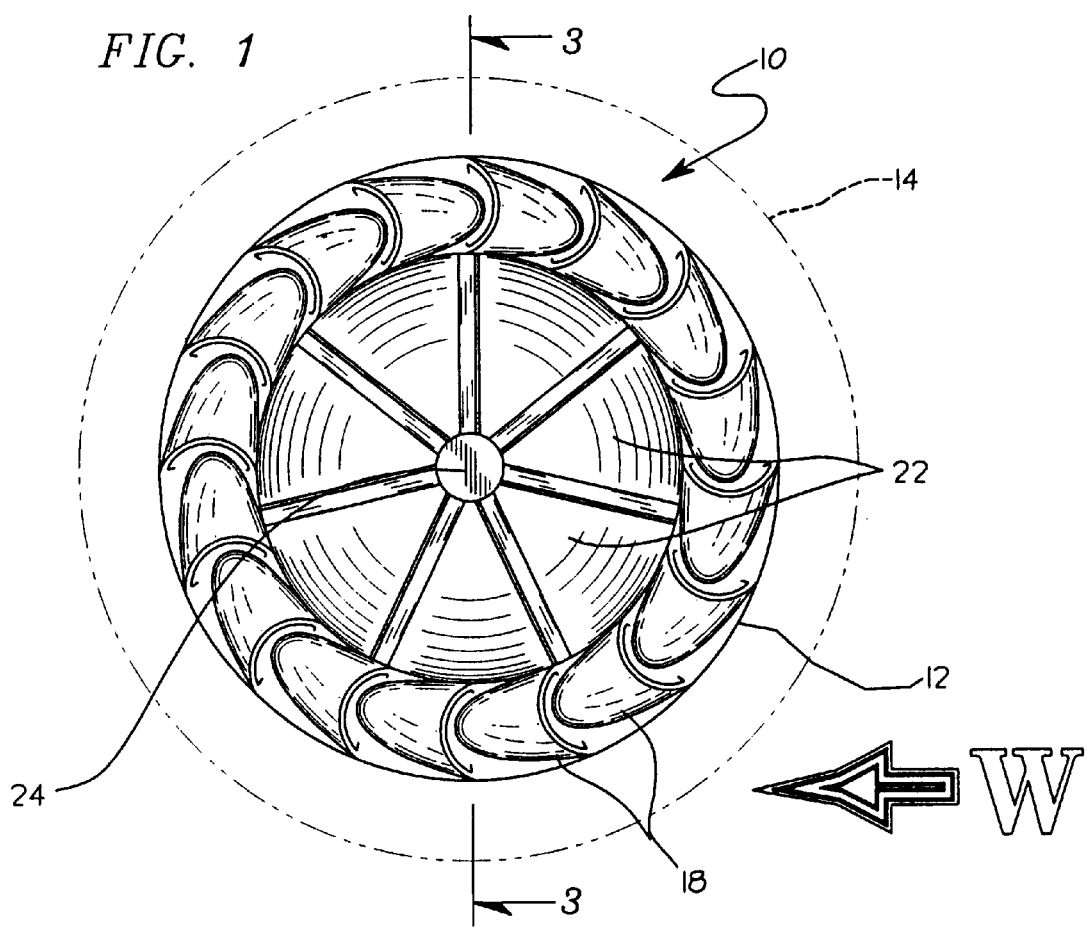
FIG. 1 is a elevation view of an aircraft wheel rotating device according to the present invention.
Figure 2:
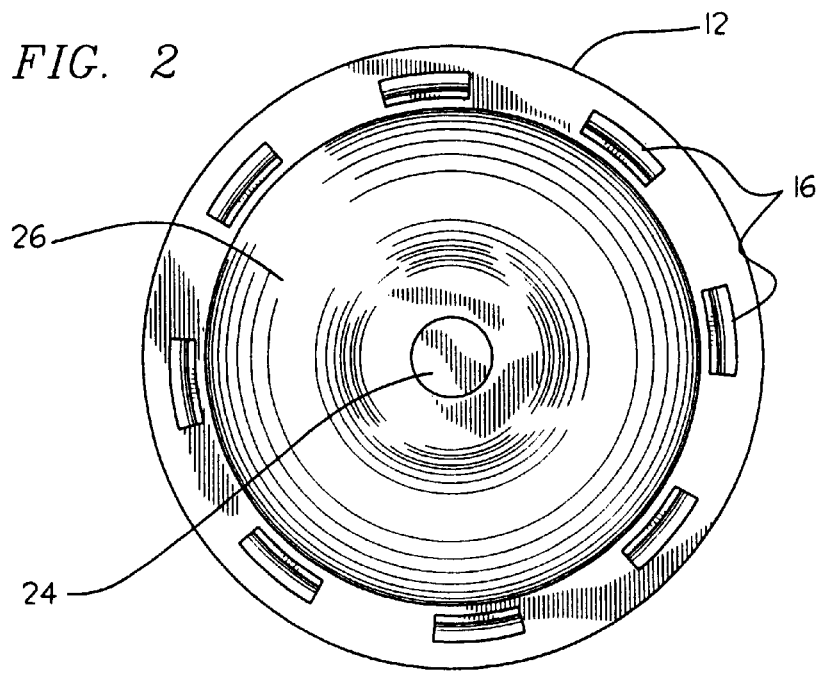
FIG. 2 is a rear elevation view thereof.
Figure 3:
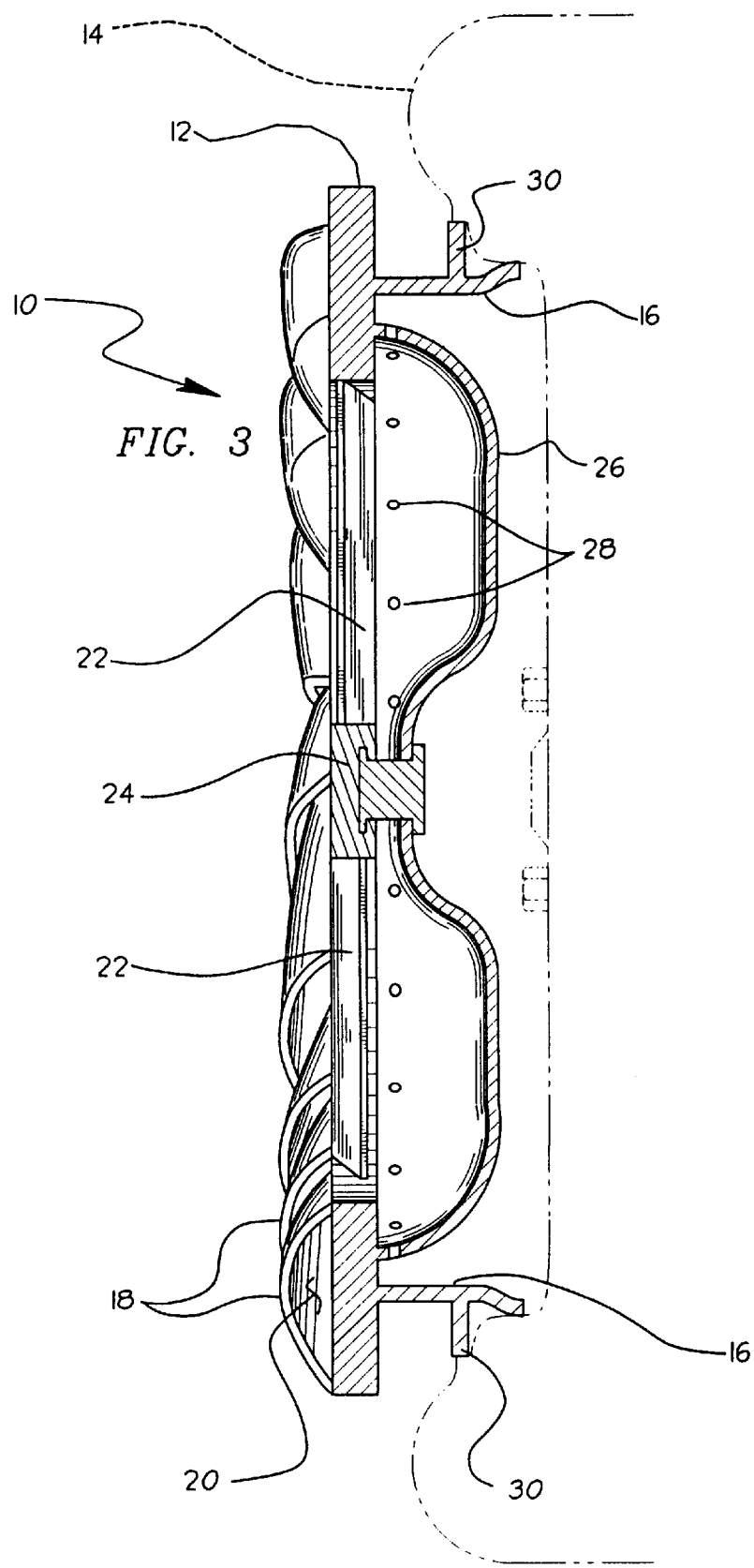
FIG. 3 is a cross sectional view taken along line 3—3 of FIG. 1.

With reference now to the drawings, and in particular to FIGS. 1–3 thereof, a new aircraft wheel rotating device embodying the principles and concepts of the present invention and generally designated by the reference numeral 10 will be described.

More specifically, it will be noted that the aircraft wheel rotating device 10 comprises an annular plate 12 having an outside diameter substantially less than an outside diameter of an aircraft wheel 14 to which the device 10 is to be associated. A plurality of engaging brackets 16 project from a rear surface of the annular plate 12 for engaging an unlabeled rim of the aircraft wheel 14 as shown in FIG. 3 of the drawings. A plurality of air scoops 18 are secured about the annular plate 12 along a front surface thereof and oriented so as to capture wind "W" passing by the aircraft wheel 14 when the same is deployed from a traveling aircraft. The air scoops 18 are oriented so as to cause a clockwise rotation of tile aircraft wheel 14 as viewed from FIG. 1 when the aircraft is traveling in a direction creating the relative wind "W" so as to pre-rotate tile aircraft wheel 14 prior to landing to reduce wear on a tire of the wheel. Preferably, tile air scoops 18, as shown in FIG. 3, are shaped so as to define a closed hollow interior 20 which captures the wind "W" and causes a rotation of tile annular plate 12 and attached aircraft wheel 14.

As best illustrated in FIGS. 1 through 3, it can be shown that the present invention 10 may further comprise a plurality of center vanes 22 extending across an interior of annular plate 12 and being oriented at an oblique angle relative to a plane containing the annular plate 12. The center vanes 22 radially extend from a center hub 24 and are coupled to tile interior surface of the annular plate 12. By this structure, when air or wind laterally impacts the aircraft wheel 14, i.e. in a direction perpendicular to a plane containing the wheel, the center vanes 22 will react so as to cause further rotation of the aircraft wheel 14. To provide for exhausting of the laterally impacting air subsequent to passage through the center vanes 22, a plenum 26 can be secured to the annular plate 12 so as to reside between a rim of the aircraft wheel 14 and the annular plate when the device 10 is installed as shown in FIG. 3. The plenum 26 includes a plurality of vent apertures 28 directed therethrough which permit an exiting or egress of air from the plenum 26 subsequent to passage through the center vanes 22. To ensure free fluid communication between an interior of the plenum 26 and an exterior of the device 10, the engaging brackets 16 are each desirably formed so as to include an abutment plate 30 which engages the rim of the aircraft wheel 14 and supports the annular plate 12 in a spaced relationship relative thereto. The center vanes 22 thus operate to receive laterally directed air to increase rotation of tile aircraft wheel 14 prior to landing of an associated aircraft. The center vanes 22 are particularly useful with aircraft in which the wheel is initially extended from the aircraft in an inoperable orientation wherein the wind "W" laterally impacts tile aircraft wheel 14, and then is rotated into an operable orientation wherein the wind "W" impacts the air scoops 18 as described above.

In use, the aircraft wheel rotating device 10 according to the present invention can be easily utilized to effect rotation of an aircraft wheel 14 prior to landing of the aircraft so as to reduce acceleration of the wheel 14 during contacting thereof with a runway. The present invention 10 thus serves to reduce wear on a tire of the aircraft wheel 14 such as typically occurs during touchdown of an associated aircraft.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aircraft wheel rotating device comprising:

an annular plate;

a plurality of center vanes extending across an interior of the annular plate, the center vanes being coupled to an interior surface of the annular plate, the center vanes being oriented at an oblique angle relative to a plane containing the annular plate such that wind laterally impacting the aircraft wheel will impact the center vanes which react so as to cause rotation of the aircraft wheel;

a plenum secured to the annular plate so as to be positionable between a rim of the aircraft wheel and the annular plate, the plenum including a plurality of vent apertures directed therethrough which permit an exiting of air from the plenum subsequent to passage through the center vanes;

a plurality of engaging brackets projecting from a rear surface of the annular plate for engaging a rim of an aircraft wheel; and a plurality of air scoops secured about the annular plate along a front surface thereof and oriented so as to capture wind passing by the aircraft wheel to cause a rotation of the aircraft wheel.

2. The aircraft wheel rotating device of claim 1, wherein the engaging brackets are each shaped so as to include an abutment plate engagable to the rim of the aircraft wheel to support the annular plate in a spaced relationship relative thereto.

3. The aircraft wheel rotating device of claim 1, wherein the air scoops are each shaped so as to define a closed hollow interior which captures wind.

4. An aircraft wheel rotating device comprising;

an aircraft wheel;

an annular plate;

a plurality of center vanes extending across an interior of the annular plate, the center vanes being coupled to an interior surface of the annular plate, the center vanes being oriented at an oblique angle relative to a plane containing the annular plate such that wind laterally impacting the aircraft wheel will impact the center vanes which react so as to cause rotation of the aircraft wheel;

a plenum secured to the annular plate so as to be positionable between a rim of the aircraft wheel and the annular plate, the plenum including a plurality of vent apertures directed therethrough which permit an exiting of air from the plenum subsequent to passage through the center vanes;

a plurality of engaging brackets projecting from a rear surface of the annular plate and being engaged to a rim of the aircraft wheel; and a plurality of air scoops secured about the annular plate along a front surface thereof and oriented so as to capture wind passing by the aircraft wheel to cause a rotation of the aircraft wheel.

5. The aircraft wheel rotating device of claim 4, wherein the engaging brackets are each shaped so as to include an abutment plate engaging the rim of the aircraft wheel to support the annular plate in a spaced relationship relative thereto.

6. The aircraft wheel rotating device of claim 4, wherein the air scoops are each shaped so as to define a closed hollow interior which captures wind.

\* \* \* \* \*